United States Patent
Chen et al.

(10) Patent No.: US 9,617,667 B1
(45) Date of Patent: Apr. 11, 2017

(54) SINKER EQUIPPED WITH LUBRICATION OIL CHANNELING AND SEPARATING STRUCTURE

(71) Applicant: PAI LUNG MACHINERY MILL CO., LTD., New Taipei (TW)

(72) Inventors: Shih-Chi Chen, New Taipei (TW); Tao Chiang, New Taipei (TW)

(73) Assignee: Pai Lung Machinery Mill Co., Ltd., New Taipei (TW)

( * ) Notice: Subject to any disclaimer, the term of this patent is extended or adjusted under 35 U.S.C. 154(b) by 0 days.

(21) Appl. No.: 14/932,675

(22) Filed: Nov. 4, 2015

(51) Int. Cl.
*D04B 35/28* (2006.01)
*F16N 7/02* (2006.01)
*D04B 15/06* (2006.01)

(52) U.S. Cl.
CPC ............ *D04B 35/28* (2013.01); *D04B 15/06* (2013.01); *F16N 7/02* (2013.01)

(58) Field of Classification Search
CPC ......... D04B 15/06; D04B 15/24; D04B 35/28
USPC ........................................... 66/107–110, 168
See application file for complete search history.

(56) References Cited

U.S. PATENT DOCUMENTS

| | | | | |
|---|---|---|---|---|
| 2,414,887 A * | 1/1947 | Miller | ............... | D04B 35/28 184/75 |
| 2,488,346 A * | 11/1949 | St Pierre | ............... | D04B 35/28 184/75 |
| 2,723,543 A * | 11/1955 | Chiodine | ............... | D04B 15/14 66/115 |
| 3,545,233 A * | 12/1970 | Lombardi | ............... | D04B 15/14 66/107 |
| 3,817,058 A * | 6/1974 | Lombardi | ............... | D04B 15/10 66/107 |
| 4,719,768 A * | 1/1988 | Lonati | ............... | D04B 35/28 184/6 |
| 5,154,259 A * | 10/1992 | Magome | ............... | D04B 35/28 184/39.1 |
| 5,388,431 A * | 2/1995 | Izumi | ............... | D04B 35/32 66/168 |
| 6,003,343 A * | 12/1999 | Plath | ............... | D04B 15/18 66/168 |
| 7,673,478 B2 * | 3/2010 | Krauss | ............... | D04B 35/30 66/8 |

FOREIGN PATENT DOCUMENTS

TW           M365935 U         10/2009

* cited by examiner

*Primary Examiner* — Danny Worrell
(74) *Attorney, Agent, or Firm* — Muncy, Geissler, Olds & Lowe, P.C.

(57) ABSTRACT

A sinker equipped with lubrication oil channeling and separating structure is an element of a knitting machine which includes at least a dial, a sinker disc, an oil ejection nozzle to sprinkle lubrication oil and a yarn feeder. The dial includes a plurality of needle troughs to hold respectively a knitting needle. The sinker disc includes a plurality of sinker troughs to hold the sinker. The sinker includes a base located in the sinker troughs, a driving nub located above the base, a knitting portion located at a front end of the base, an oil sprinkling zone interposed between the base and the knitting portion, and a lubrication oil channeling and separating structure interposed between the knitting portion and the oil sprinkling zone. The lubrication oil channeling and separating structure includes a separating slot, a flow channeling portion and an oil blocking portion that are around the separating slot.

12 Claims, 8 Drawing Sheets

SINKER EQUIPPED WITH LUBRICATION OIL CHANNELING AND SEPARATING STRUCTURE

FIELD OF THE INVENTION

The present invention relates to a sinker of knitting machines and particularly to a sinker equipped with lubrication oil channeling and separating structure.

BACKGROUND OF THE INVENTION

As shown in FIGS. 1 and 2, a conventional sinker 10 on a knitting machine generally can be moved reciprocally to-and-fro by driving a nub 11 formed thereon. When the sinker 10 is in operation reciprocally for a prolonged period of time, other portions of the sinker 10 such as the push friction end 101, first driving friction end 111, second driving friction end 112 and loading friction end 121 have to be properly cooled and lubricated. The most common approach at present is applying lubrication oil. In practice the sinker 10 includes an oil sprinkling zone 14 to receive lubrication oil 71 sprinkled from an oil ejection nozzle 70, and the lubrication oil 71 flows downward after sprinkling to cool and lubricate the push friction end 101, first driving friction end 111, second driving friction end 112 and loading friction end 121. However, because the design and structure of the conventional sinker 10 often do not take into account of the lubrication oil could flow to the knitting portion 13, yarns in the knitting portion 13 could be smeared by the lubrication oil during knitting operation and result in increasing of quality defects of the knitting fabrics.

To remedy the aforesaid problem Taiwan patent No. M365935 discloses an improvement for a sinker that mainly includes a flank, a nose at an upper side of the rear end of the flank, a nose located at a upper side of a rear end of the flank, a guide portion at a lower side of the rear end, and a notch at the bottom edge of the flank that can be formed in a square, a trapezoid, an arc or other shapes. The notch also shapes the bottom edge of the flank to form a front bottom edge and a rear bottom edge. The guide portion and the flank are spaced from each other. The guide portion is jutting at a length to cover the notch, namely the jutting portion of the guide portion includes a front end formed at a size slightly greater than or equal to the location distance of the front end wall of the notch. The guide portion is located below the rear end of the flank. The sinker also includes a guiding nub at the read side. Through the aforesaid structure when the sinker and its corresponding knitting needle are in knitting operation they can be positioned at the notch to fend off lubrication oil. However, with the notch formed at the bottom edge of the sinker, when the knitting needle corresponding to the notch is withdrawing the sinker remains moving to and fro continuously, as a result the lubrication oil remained at two sides of the notch still can smear the yarns and cause quality defects of the knitted fabrics. It is obvious that although the aforesaid conventional technique that adopts the design of the notch can reduce the chance or amount of smearing the yarns with lubrication oil, during knitting operation the sinker still cannot fully separate the lubrication oil from the yarns or their knitting fabrics.

In view of the shortcomings of the conventional sinker how to provide improvement of the sinker to fully and effectively separate the lubrication oil from in contact with the yarns or their knitting fabrics is an issue remained to be resolved in the industry.

SUMMARY OF THE INVENTION

The primary object of the present invention is to solve the shortcomings and problems of the conventional technique by providing a solution that can fully and effectively separate lubrication oil from in contact with yarns or knitting fabrics thereof to improve fabric quality to meet industry and market requirements.

To achieve the foregoing object the present invention provides a sinker equipped with lubrication oil channeling and separating structure. The sinker is a knitting element used on a knitting machine. The knitting machine includes at least a dial, a sinker disc, an oil ejection nozzle located above the sinker disc and a yarn feeder located above the dial and the sinker disc. The dial includes a plurality of needle troughs to hold respectively a knitting needle. The sinker disc includes a plurality of sinker troughs corresponding to the needle troughs to hold the sinker. The sinker includes a base slidable in the sinker troughs and generating friction therewith, a driving nub located above the base, a knitting portion located at a front end of the base, an oil sprinkling zone interposed between the base and the knitting portion corresponding to the oil ejection nozzle, and a lubrication oil channeling and separating structure interposed between the knitting portion and the oil sprinkling zone. The lubrication oil channeling and separating structure includes a separating slot formed upward from a lower side, a flow channeling portion around the separating slot and close to the oil sprinkling zone, and an oil blocking portion around the separating slot and close to the knitting portion.

In one aspect the lubrication oil channeling and separating structure further includes a jutting debris push portion around the separating slot and below the flow channeling portion.

In another aspect when the sinker has fully finished withdrawing movement on the sinker disc the debris push portion is fully withdrawn inside the sinker trough, and when the sinker has been fully pushed out from the sinker disc the debris push portion is exposed outside the sinker trough.

In yet another aspect the flow channeling portion is inclined from a top end thereof downward towards the oil blocking portion.

In yet another aspect the oil blocking portion is interposed between the separating slot and the knitting portion, and when the sinker has fully finished withdrawing or push out movement the oil blocking portion is located outside the sinker trough.

The invention, through the construction set forth above, compared with the conventional techniques, can provide many advantages, such as: the flow channeling portion, the debris push portion and the oil blocking portion are formed around the separating slot that provide respectively different functions of flow channeling, debris pushing and oil blocking, hence the flow channeling portion and the oil blocking portion not only can fully separate lubrication oil from in contact with yarns or the knitting fabrics thereof, the debris push portion can also push out cotton debris sunk into the sinker troughs during knitting operation to improve sliding smoothness of the sinker in the sinker troughs, thereby can improve the quality of the knitting fabrics to meet industry and market requirements.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
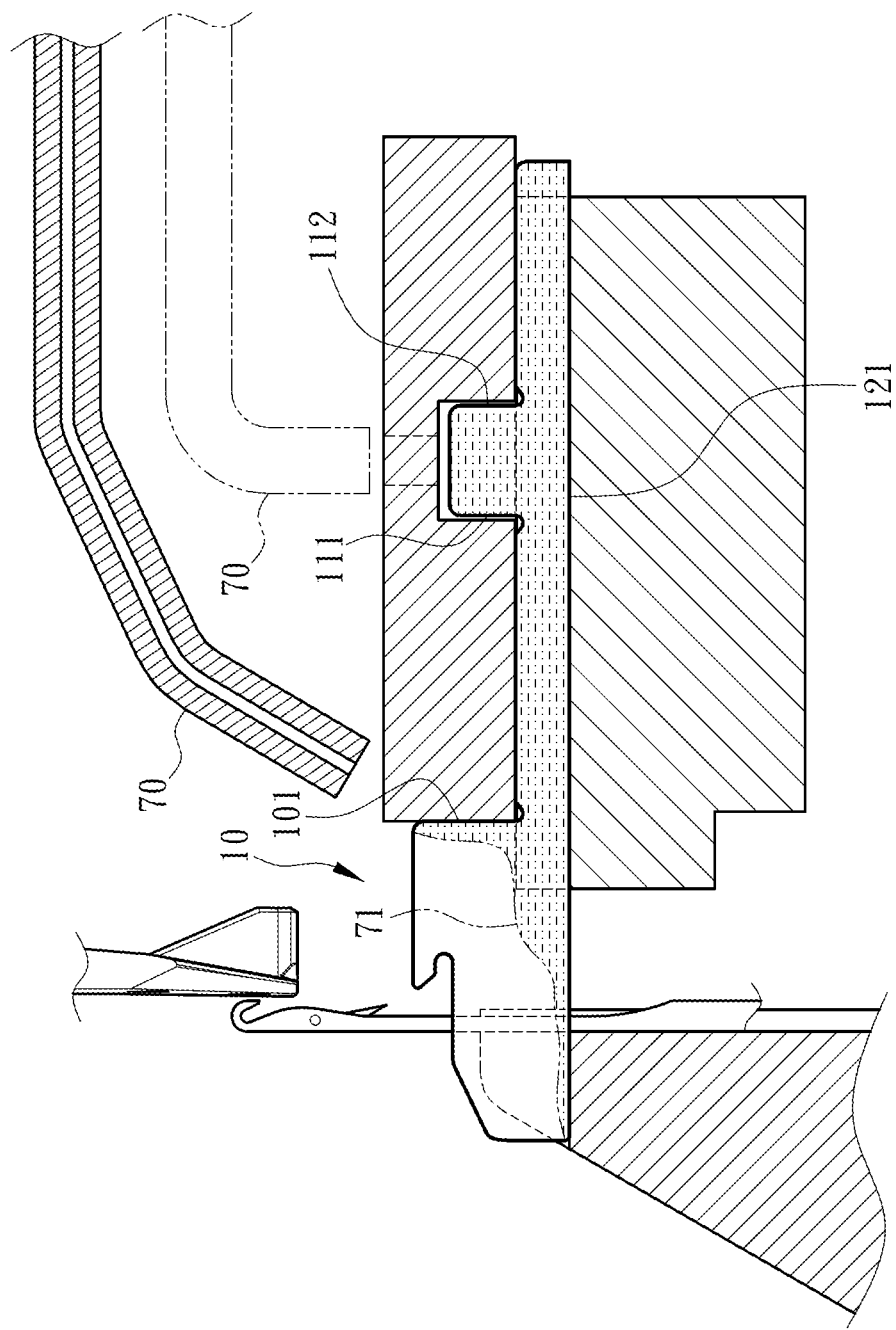
FIG. 1 is a fragmentary sectional view of a conventional sinker located in a knitting machine.
Figure 2:
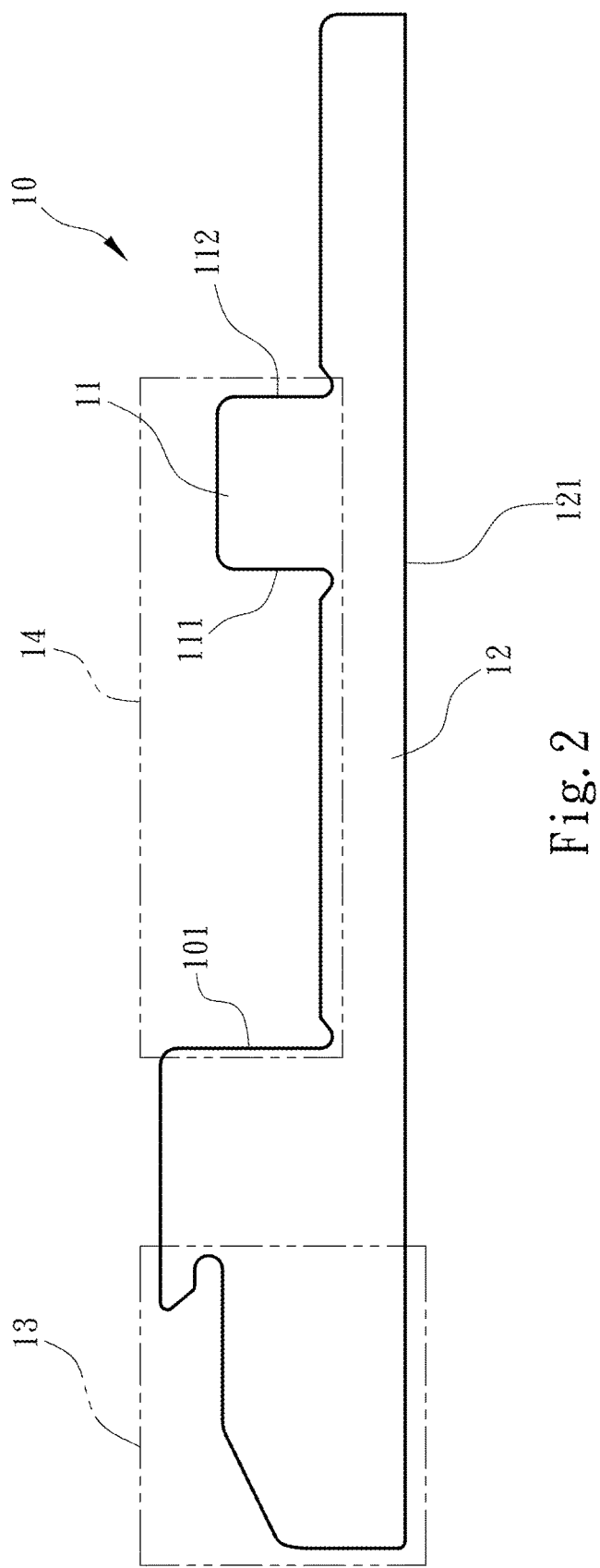
FIG. 2 is a plane view of the conventional sinker according to FIG. 1.
Figure 3:
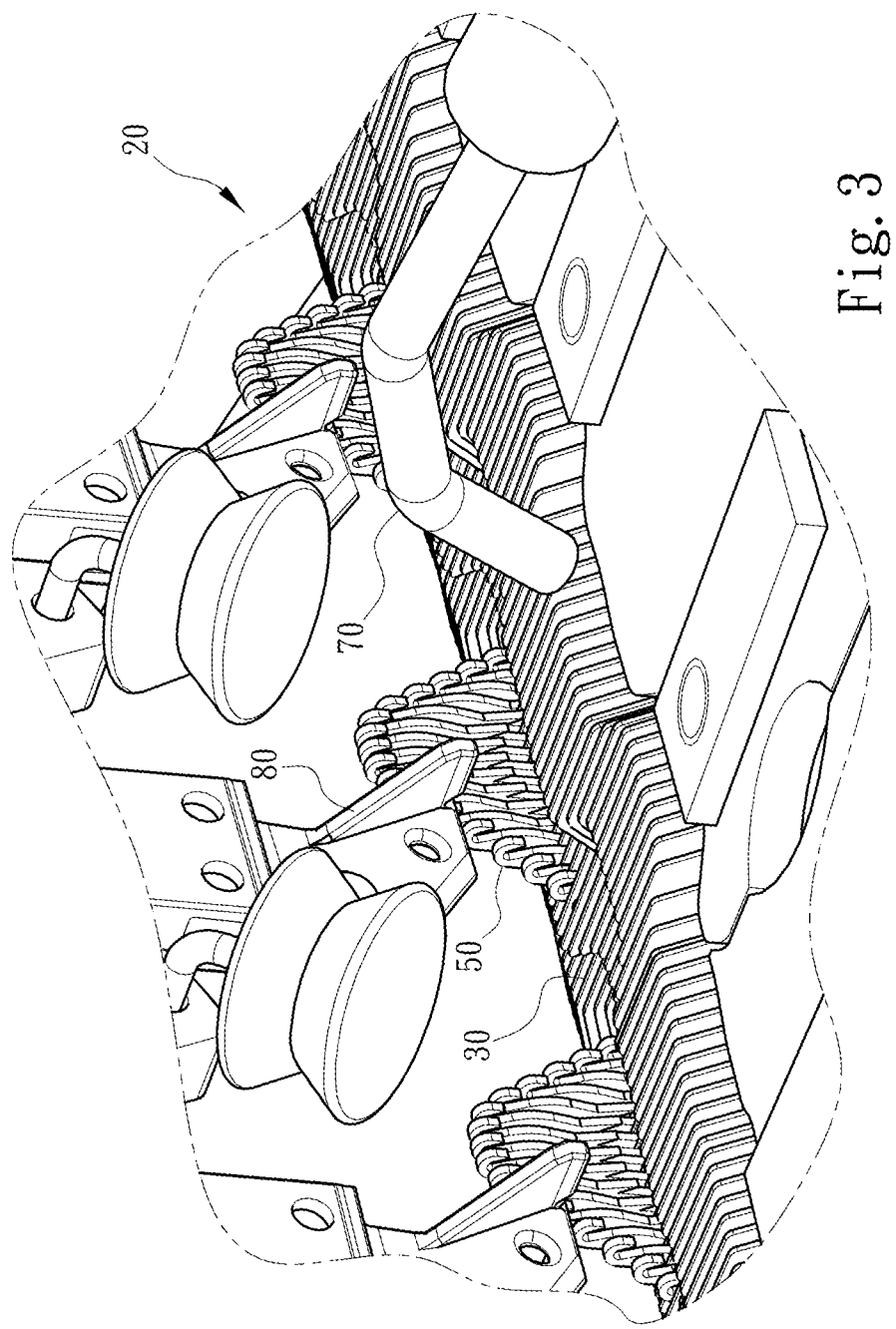
FIG. 3 is a fragmentary enlarged perspective view of an embodiment of the invention.
Figure 4:
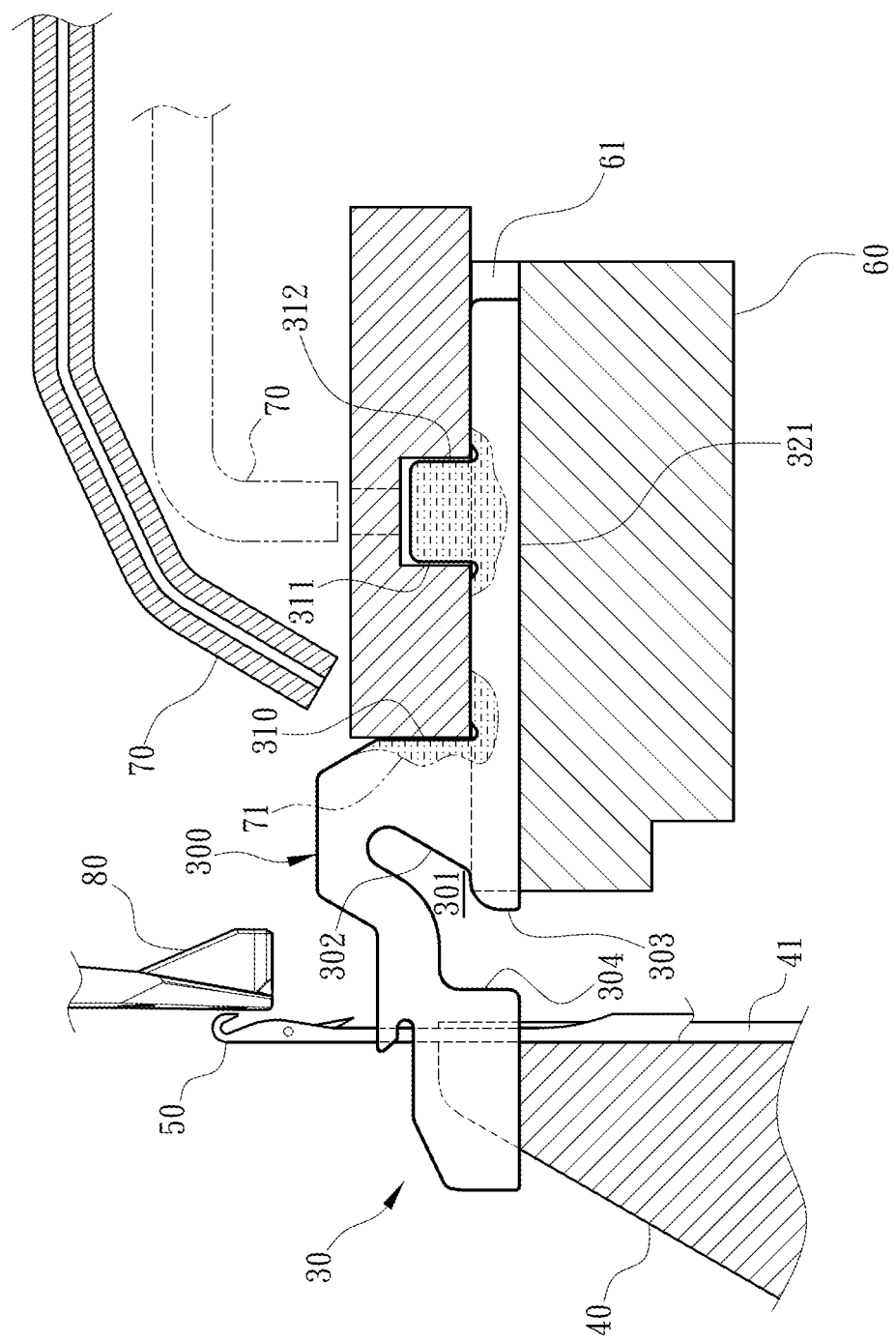
FIG. 4 is a fragmentary sectional view according to FIG. 3.
Figure 5:
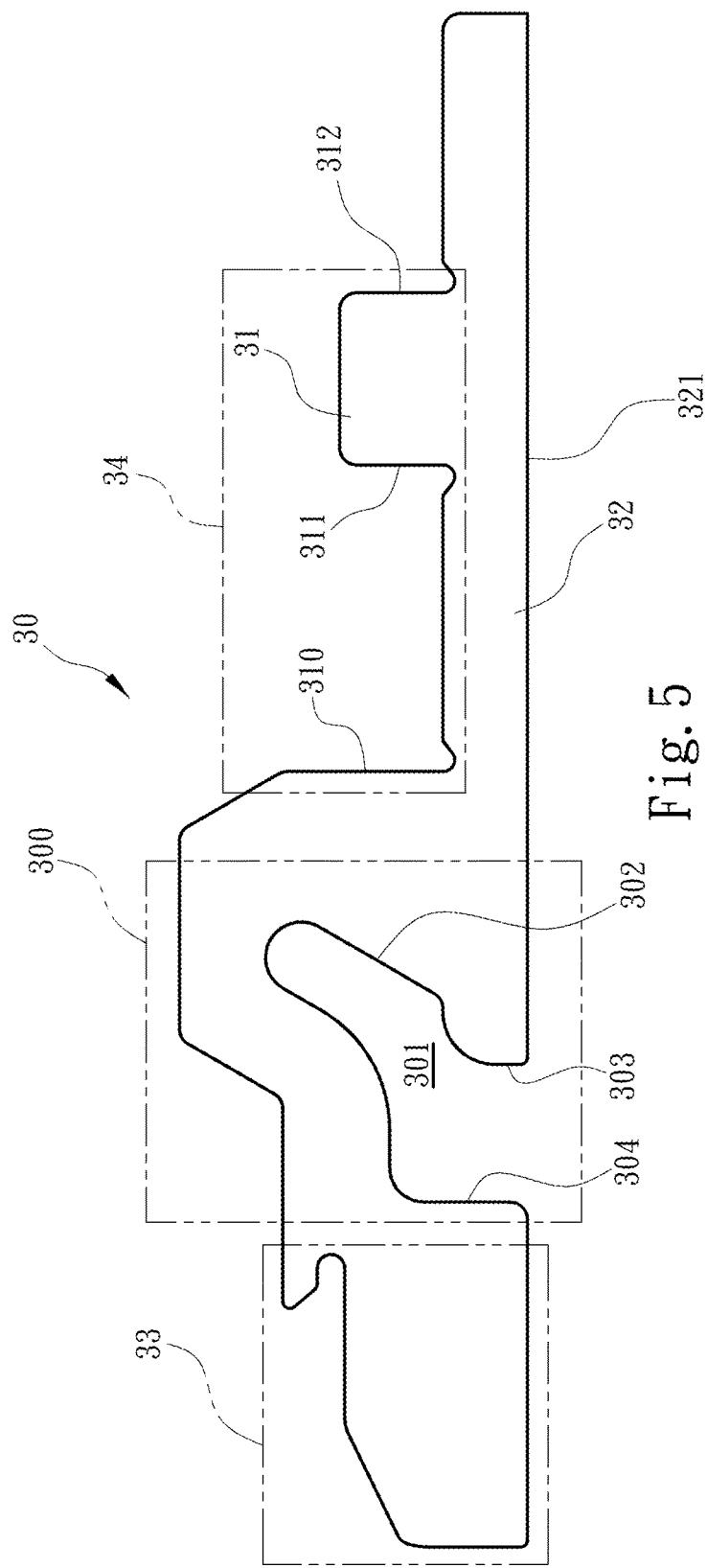
FIG. 5 is a plane view of the sinker according to FIG. 4.

As shown in FIGS. 3 through 5, the present invention aims to provide a sinker equipped with lubrication oil channeling and separating structure. The sinker 30 is a knitting element used in a knitting machine 20. The knitting machine 20 includes at least a dial 40, a sinker disc 60, an oil ejection nozzle 70 located above the sinker disc 60 to sprinkle lubrication oil 71 and a yarn feeder 80 located above the dial 40 and the sinker disc 60. The dial 40 includes a plurality of needle troughs 41 to hold respectively a knitting needle 50. The sinker disc 60 includes a plurality of sinker troughs 61 corresponding to the needle troughs 41 to hold the sinker 30. The sinker 30 includes a base 32 slidable in the sinker troughs 61 to generate friction therewith, a driving nub 31 located above the base 32, a knitting portion 33 located at a front end of the base 32, and an oil sprinkling zone 34 interposed between the base 32 and the knitting portion 33 corresponding to the oil ejection nozzle 70. While the sinker 30 is driven mainly four frictional portions are generated, including a push-out friction end 310, a first driving friction end 311, a second driving friction end 312 and a loading friction end 321. The oil ejection nozzle 70 is directly located above the oil sprinkling zone 34 so that the lubrication oil 71 can enhance lubrication and cooling through the oil sprinkling zone 34 to the push-out friction end 310, the first driving friction end 311, the second driving friction end 312 and the loading friction end 321. It is to be noted that the invention also includes a lubrication oil channeling and separating structure 300 interposed between the knitting portion 33 and the oil sprinkling zone 34. The lubrication oil channeling and separating structure 300 includes a separating slot 301 formed upward from a lower side, a flow channeling portion 302 around the separating slot 301 and close to the oil sprinkling zone 34, and an oil blocking portion 304 around the separating slot 301 and close to the knitting portion 33. It is also to be noted that the lubrication oil channeling and separating structure 300 further includes a jutting debris push portion 303 located around the separating slot 301 below the flow channeling portion 302. When the sinker 30 has fully finished withdrawing movement on the sinker disc 60 the debris push portion 303 is fully withdrawn inside the sinker trough 61, and when the sinker 30 has been fully pushed out from the sinker disc 60 the debris push portion 303 is exposed outside the sinker trough 61. Moreover, the flow channeling portion 302 is inclined from a top end downward towards the oil blocking portion 304. The oil blocking portion 304 is interposed between the separating slot 301 and the knitting portion 33, and when the sinker 30 has fully finished withdrawing or push out movement the oil blocking portion 304 is located outside the sinker trough 61.

Figure 6:
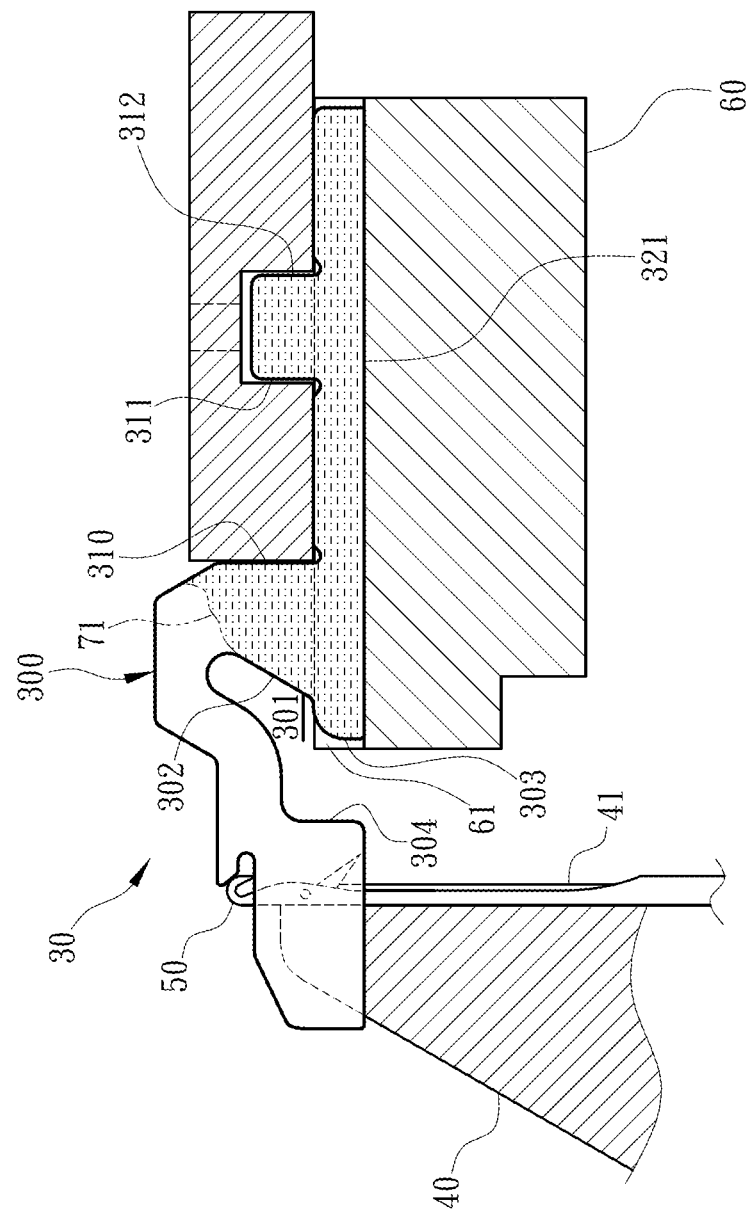
FIGS. 6 through 8 are schematic views of continuous operation conditions of the invention according to FIG. 4.
Figure 7:
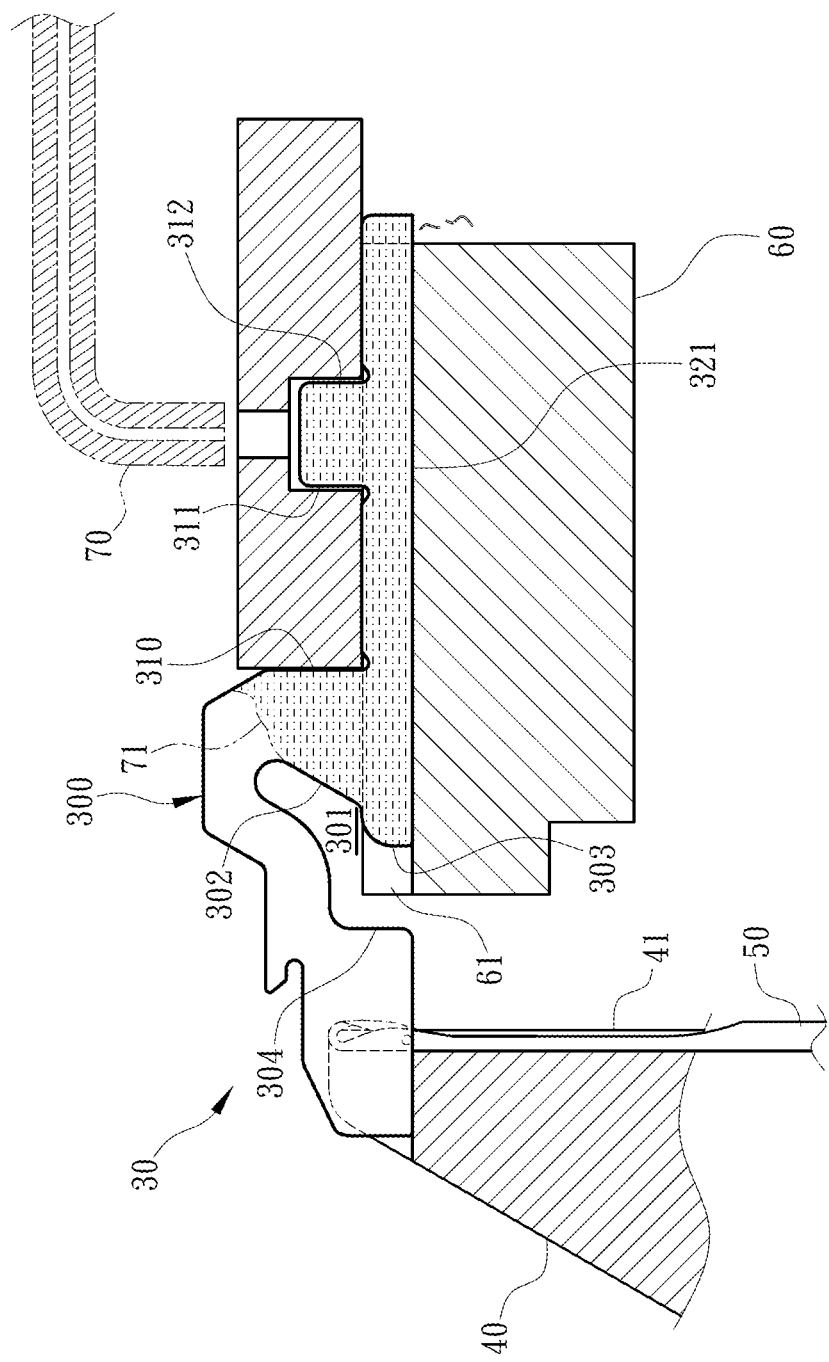
Figure 8:
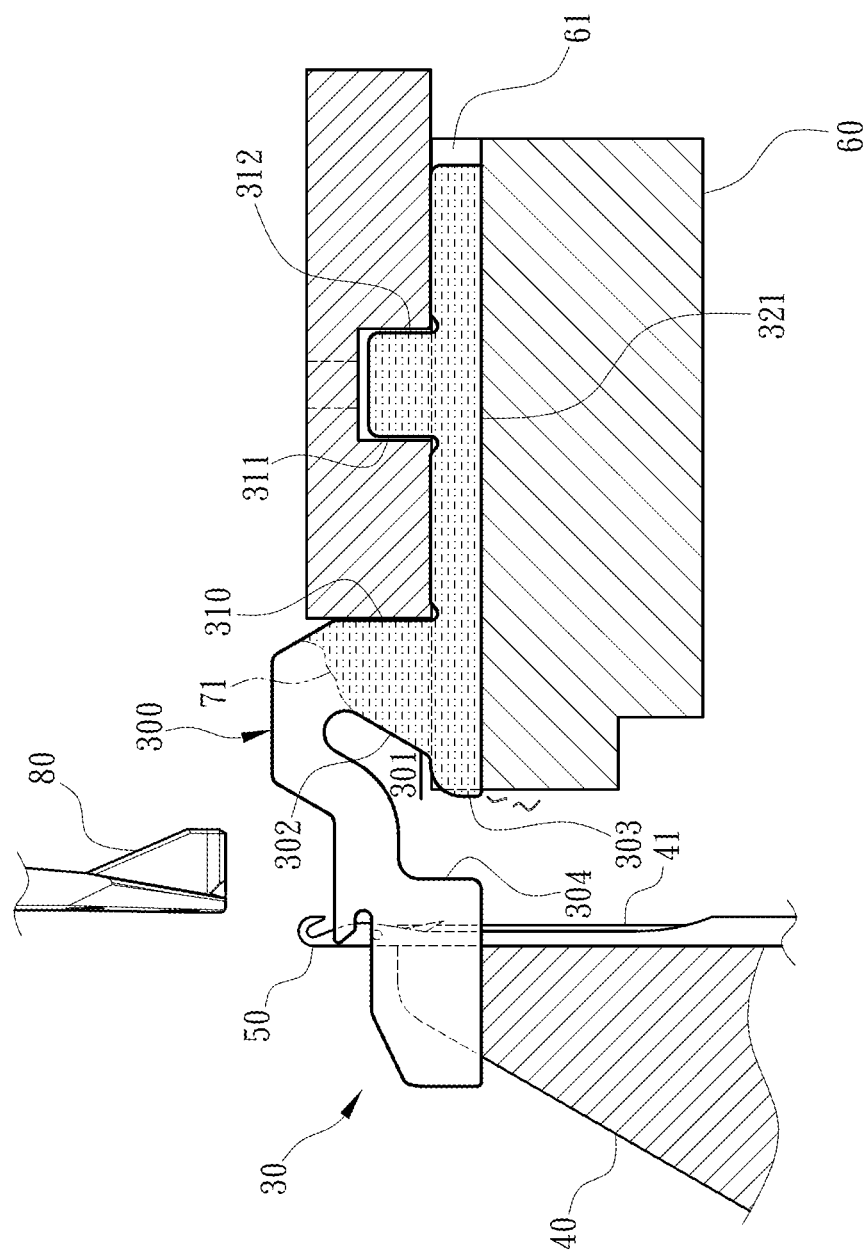

As shown in FIGS. 4 through 8, when the invention is in use, the sinker 30 can be driven and swiveled, and the driving nub 31 is driven to allow the sinker 30 to be fully pushed out from the sinker disc 60 beneath the oil ejection nozzle 70, while the oil ejection nozzle 70 continuously sprinkles the lubrication oil 71 the oil sprinkling zone 34 receive sprinkling of the lubrication oil 71 which starts to flow downward to the base 32 as shown in FIG. 4. When the sinker 30 is driven continuously and swivels to start withdrawing movement it also moves away from where the oil ejection nozzle 70 sprinkles the lubrication oil 71, hence although the oil ejection nozzle 70 continuously sprinkles the lubrication oil 71 the oil sprinkling zone 34 of the sinker 30 does not receive sprinkling of the lubrication oil 71, while the lubrication oil 71 received previously flows naturally toward the base 32 and enters the sinker trough 61 as shown in FIG. 6. Finally, when the sinker 30 is driven and swivels and is fully withdrawn, most of the lubrication oil 71 on the sinker 30 has flown into the sinker trough 61 between the sinker trough 61 and the base 32, thereby can serve as a medium to cool temperature and perform lubrication between the sinker trough 61 and the base 32; meanwhile, the distal end of the base 32 also can push debris dropped into the sinker trough 61 outward as shown in FIG. 7. It is to be noted that, as shown in FIG. 7, during the lubrication oil 71 flows along a path from the sinker 30 toward the base 32 into the sinker trough 61 the swiveling sinker 30 in the withdrawing process generates a centrifugal force to cause deviation of the flowing path of the lubrication oil 71 that might otherwise flowing directly downward. Thus, with the lubrication oil channeling and separating structure 300 formed on the sinker 30 the flow channeling portion 302 around the separating slot 301 can accelerate flowing downward of the lubrication oil 71, and since the oil blocking portion 304 is located on an outer side of the sinker trough 61 during fully withdrawing of the sinker 30 the lubrication oil 71 cannot pass over the separating slot 301. As a result, flowing of the lubrication oil 71 to the knitting portion 33 can be averted. It is to be noted that after the sinker 30 is driven and swivels to be pushed outward again the jutting debris push portion 303 around the separating slot 301 below the flow channeling portion 302 pushes the debris dropped into the sinker trough 61 outside as shown in FIG. 8.

As a conclusion, the sinker of the invention includes the lubrication oil channeling and separating structure which includes the flow channeling portion, the debris push portion and the oil blocking portion formed around the separating slot, and the flow channeling portion, the debris push portion and the oil blocking portion can provide various functions such as accelerating flow directing and downward of the lubrication oil, push out of the debris dropped into the sinker trough, and also block the lubrication oil from flowing to the knitting portion. As a result, the flow channeling portion and the oil blocking portion not only can fully separate the lubrication oil from in contact with the yarns or their fabrics, the debris push portion also can push the debris dropped into the sinker trough during knitting operation to improve sliding smoothness of the sinker in the sinker trough, thereby enhance fabric quality to better meet industry and market requirements.

What is claimed is:

1. A sinker equipped with lubrication oil channeling and separating structure and the sinker formed to serve as an element of a knitting machine, the sinker mounted to one of a plurality of sinker troughs on a sinker disc, and the sinker faced an oil ejection nozzle located above the sinker disc, the sinker comprising:
- a base slidable in the sinker troughs to generate friction therewith,
- a driving nub located above the base;
- a knitting portion located at a front end of the base;
- an oil sprinkling zone located on the base and facing the oil ejection nozzle; and
- a lubrication oil channeling and separating structure which is interposed between the knitting portion and the oil sprinkling zone and includes a separating slot formed upward from a lower side, the separating slot defining a flow channeling portion and a no-oil portion, the flow channeling portion located on one side of the separating slot adjacent to the oil sprinkling zone, and the no-oil portion located on one side of the flow channeling portion adjacent to the knitting portion.

2. The sinker equipped with lubrication oil channeling and separating structure of claim 1, wherein the lubrication oil channeling and separating structure further includes a jutting debris push portion around the separating slot and below the flow channeling portion.

3. The sinker equipped with lubrication oil channeling and separating structure of claim 2, wherein the debris push portion is fully withdrawn into the sinker trough while the sinker is fully withdrawn on the sinker disc, and the debris push portion is exposed outside the sinker trough while the sinker is being fully pushed outside the sinker disc.

4. The sinker equipped with lubrication oil channeling and separating structure of claim 1, wherein the flow channeling portion is inclined from bottom of the separating slot toward the no-oil portion.

5. The sinker equipped with lubrication oil channeling and separating structure of claim 2, wherein the flow channeling portion is inclined from bottom of the separating slot toward the no-oil portion.

6. The sinker equipped with lubrication oil channeling and separating structure of claim 3, wherein the flow channeling portion is inclined from bottom of the separating slot toward the no-oil portion.

7. The sinker equipped with lubrication oil channeling and separating structure of claim 1, wherein the oil blocking portion is interposed between the separating slot and the knitting portion, and located outside the sinker trough while the sinker is fully withdrawn or pushed out on the sinker disc.

8. The sinker equipped with lubrication oil channeling and separating structure of claim 2, wherein the oil blocking portion is interposed between the separating slot and the knitting portion, and located outside the sinker trough while the sinker is fully withdrawn or pushed out on the sinker disc.

9. The sinker equipped with lubrication oil channeling and separating structure of claim 3, wherein the oil blocking portion is interposed between the separating slot and the knitting portion, and located outside the sinker trough while the sinker is fully withdrawn or pushed out on the sinker disc.

10. The sinker equipped with lubrication oil channeling and separating structure of claim 4, wherein the oil blocking portion is interposed between the separating slot and the knitting portion, and located outside the sinker trough while the sinker is fully withdrawn or pushed out on the sinker disc.

11. The sinker equipped with lubrication oil channeling and separating structure of claim 5, wherein the oil blocking portion is interposed between the separating slot and the knitting portion, and located outside the sinker trough while the sinker is fully withdrawn or pushed out on the sinker disc.

12. The sinker equipped with lubrication oil channeling and separating structure of claim 6, wherein the oil blocking portion is interposed between the separating slot and the knitting portion, and located outside the sinker trough while the sinker is fully withdrawn or pushed out on the sinker disc.

* * * * *